(No Model.) 3 Sheets—Sheet 1.

O. B. SHALLENBERGER.
METER FOR ALTERNATING ELECTRIC CURRENTS.

No. 419,367. Patented Jan. 14, 1890.

WITNESSES:

INVENTOR,
Oliver B. Shallenberger.

Att'ys.

(No Model.) 3 Sheets—Sheet 2.

O. B. SHALLENBERGER.
METER FOR ALTERNATING ELECTRIC CURRENTS.

No. 419,367. Patented Jan. 14, 1890.

WITNESSES:

INVENTOR,
Oliver B. Shallenberger.
Pope, Edgecomb & Jerry
Att'ys.

(No Model.) 3 Sheets—Sheet 3.
O. B. SHALLENBERGER.
METER FOR ALTERNATING ELECTRIC CURRENTS.
No. 419,367. Patented Jan. 14, 1890.
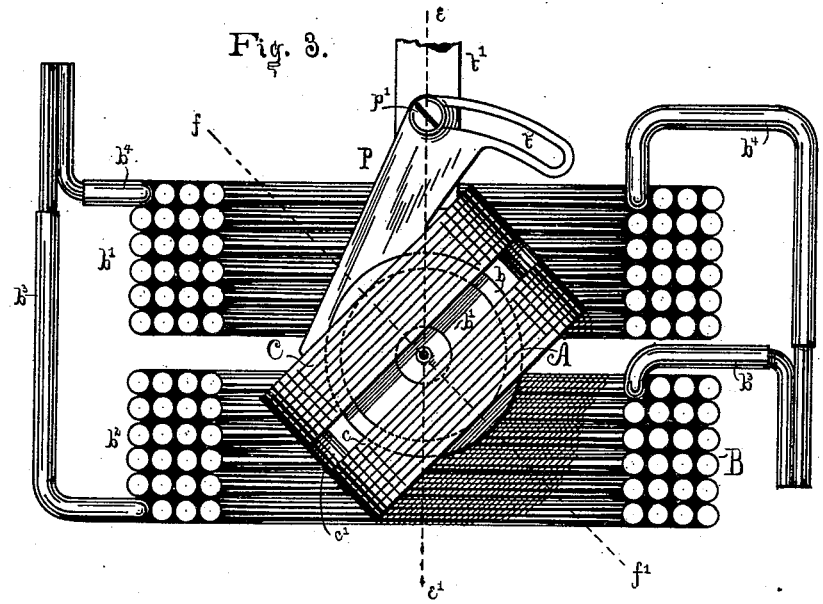
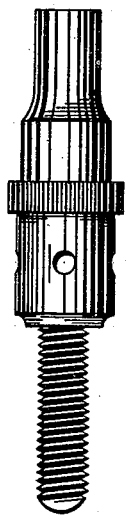 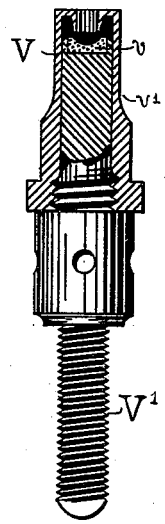
Witnesses:
Herbert B. Shallenberger.
Hubert C. Tener.
Inventor,
Oliver B. Shallenberger.
Pope, Edgecomb & Terry
Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

METER FOR ALTERNATING ELECTRIC CURRENTS.

SPECIFICATION forming part of Letters Patent No. 419,367, dated January 14, 1890.

Application filed October 31, 1888. Serial No. 289,635. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Meters for Alternating Electric Currents, (Case No. 234,) of which the following is a specification.

In certain patents issued to me August 14, 1888, Nos. 388,003 and 388,004, I have described an apparatus for and a method of measuring alternating electric currents.

The present invention relates to certain improvements in the apparatus described in said patents, and it involves various details of construction, which will be described in connection with the accompanying drawings.

It will not be here necessary to describe particularly the method of operation of the meter, since that has already been set forth in the patents mentioned, and reference may be had thereto for such description.

Figure 1:
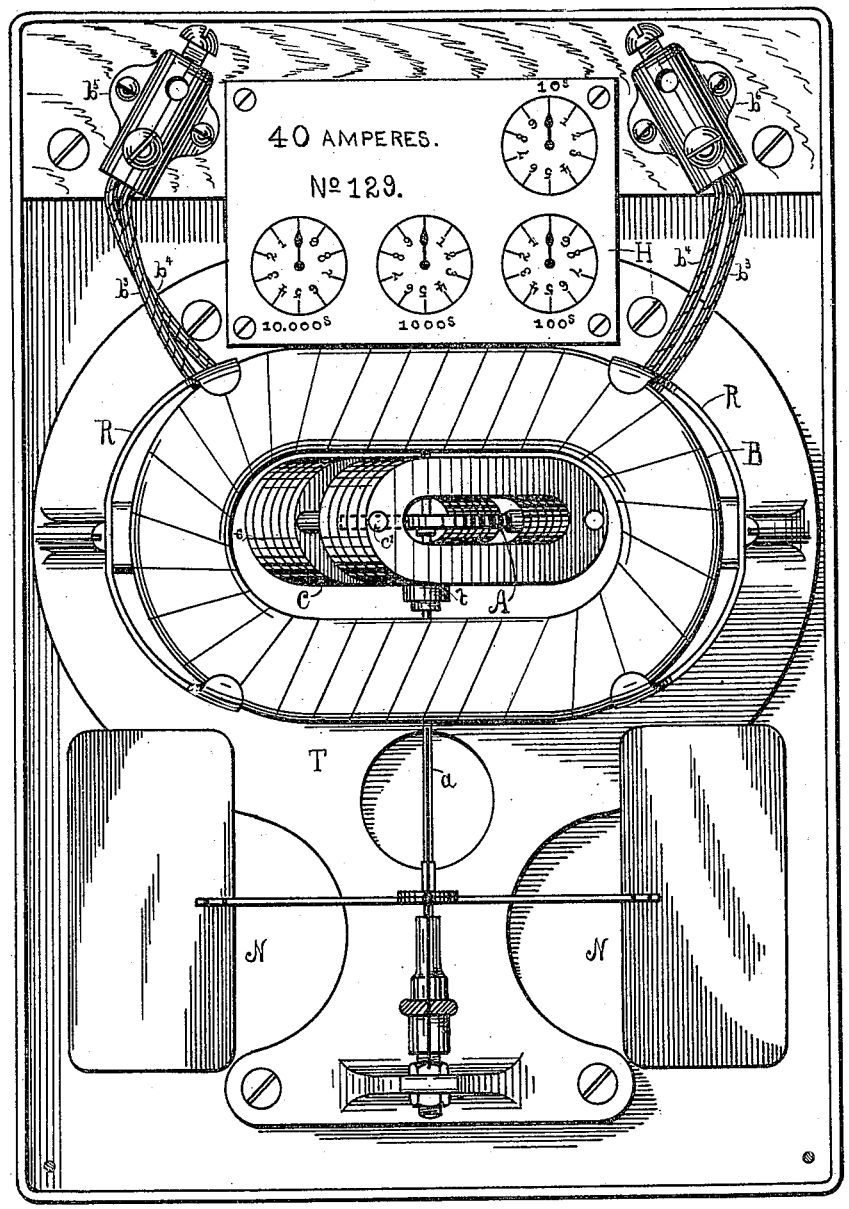
Figure 2:
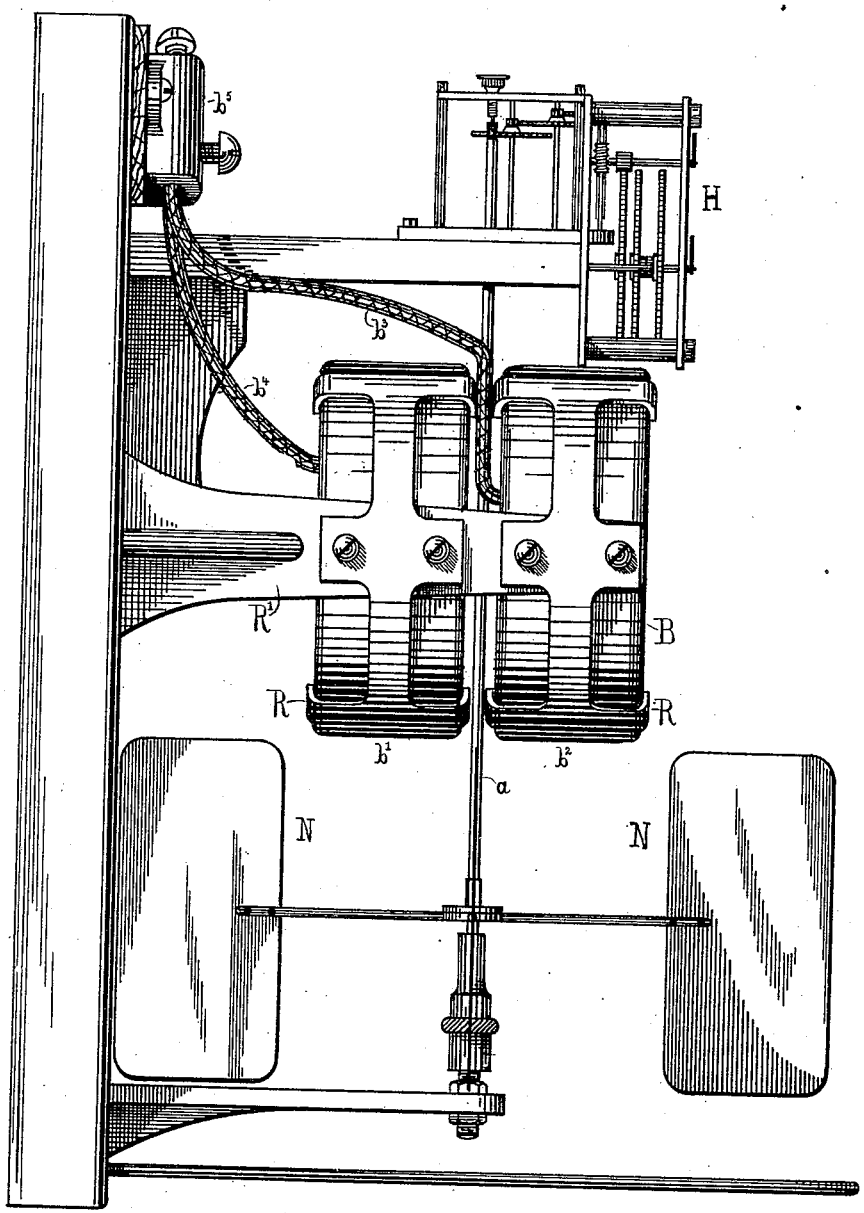

In the accompanying drawings, Figure 1 is a front elevation of a complete meter, and Fig. 2 is a side elevation of the same. Fig. 3 is a plan, partly in section, of a portion of the apparatus. Fig. 4 is an enlarged section of the armature, and Figs. 5 and 6 are enlarged details showing the construction of one of the bearings for the armature-shaft.

Referring to the drawings, A represents a circular armature of metal. This may be a ring or a disk or of other suitable shape, and may be of soft iron, or it may be of copper or other electric conducting material. I have obtained excellent results by constructing the armature in the following manner: A ring $b$, of soft iron, is placed upon a thin disk $b'$, of copper. The edge of the disk is then turned over the iron, as shown in Fig. 4, securing the two parts together. The disk is mounted upon a shaft $a$, which is carried in suitable bearings, to be presently described. Instead of employing a copper disk $b'$, aluminium may sometimes be employed with advantage. This lessens the weight of the armature.

The armature is placed within a coiled conductor B, of insulated electric conducting material. The coil B is shown as being formed in two sections $b'$ $b^2$, and the shaft $a$ passes between the two sections. These two sections may be connected in circuit either in series or in multiple arc for different purposes. The conductor B may be conveniently supported by clamps R, secured to arms R', projecting from the frame T, supporting the meter. The terminals $b^3$ $b^3$ and $b^4$ $b^4$ of the conductor are led to binding-plates $b^5$ $b^6$ at the top of the meter. These terminals are shown as connected, so that the two sections of the coil are in multiple; but they may be interchanged, so that the current will traverse the two sections in series when it is desired to obtain greater effects upon the meter from a given current.

A second conductor C is placed in inductive relation to the conductor B and armature A. This conductor C is shown as closed upon itself, and it is preferably composed of a number of flat rings $c$, of copper, arranged in two groups—one on either side of the axis $a$—and bound together by rivets or bolts $c'$. Metal washers may intervene between the separate rings $c$ for the purpose of leaving air-spaces between them. This construction better insures, also, that the induced currents shall circulate freely in a direction approximately at right angles to the axis of the conductor. The conductor C is placed with its magnetic axis at an inclination to that of the conductor B. Alternating currents traversing the coil B establish a field of force for the armature, the polar line of which is approximately in the direction $e$ $e'$, and such currents also induce currents in the conductor C. Alternating currents traversing the conductor C establish a field of force for the armature, the polar line or magnetic axis of which is in approximately the direction $f$ $f'$—that is to say, inclined with reference to the polar line of the conductor B. When the coil B is traversed by alternating electric currents, the armature A will revolve.

For the purpose of controlling the motion of the armature, suitable fans or vanes N N are carried by the shaft $a$, and the resistance offered by the air to the rotation of these vanes affords the required retardation.

A record of the revolutions of the movable element or armature A is obtained by means of a counting or registering train H. This is of any well-known convenient construction. It is here shown as mounted above the coils and at the front of the instrument and geared through a suitable train with a shaft $a$. The dials upon the face of the registering-train indicate the number of ampère hours of current consumed in the circuit to which the meter is applied.

For the purpose of adjusting the rate of revolution of the armature A, so that under the influence of any given current the indications shall have a corresponding value, I have found it convenient to vary the angle at which the conductor C stands with reference to the coil B. For this purpose the conductor C is pivoted upon an arm $t'$, so that it can be turned about the shaft $a$, and an adjusting-plate P, secured to the conductor C, is employed for fixing it at any required angle. A slot $t$ and set-screw $p'$, entering the arm $t'$, serve to fix it in such position. The conductor may be supported entirely by the plate P; but it is usually preferred to also employ the central support.

In practice it is found that some special means are necessary to prevent the wearing away of the lower bearing of the shaft $a$. For this reason I have constructed the bearing in the following manner: The end of the shaft $a$ is of hardened steel and rests in a jewel, (represented at $v$ in Fig. 6.) This jewel is set in the end of a support $v'$, placed in a cup V. The support may be adjusted vertically in the cup by means of a screw-thread, as shown in Fig. 6. The upper edge of the cup is turned inward and downward, leaving sufficient space for the shaft $a$ to pass through. Within the cup there is placed a small quantity of oil or other lubricating substance, which will prevent the shaft and jewel from wearing each other. The peculiar form of the cup prevents the oil from escaping in whatever position the meter may chance to be carried during transportation. The entire lower bearing may be supported from the frame T by an adjustable set-screw V', so that the armature may be accurately adjusted in the coils.

In another application, Serial No. 325,291, filed September 27, 1889, other claims are made to the construction of the closed secondary conductor described herein.

I claim as my invention—

1. In an electric meter having a rotating armature, an inducing-conductor polarizing said armature when traversed by alternating electric currents, and a second inducing-conductor receiving currents from the first and polarizing said armature in a different direction, and an adjustable support for one of said conductors, whereby it may be turned about the axis of said armature.

2. In an electric meter having a rotating armature and two polarizing-conductors for the same, an adjustment for one of the polarizing-conductors, consisting of a movable support therefor, and means for securing the support in any required position.

3. In an electric meter having a rotating armature, a polarizing-conductor therefor, and a second polarizing-conductor tending when traversed by electric currents to polarize the armature in a different direction from the first, said second conductor being adjustable with reference to the first, whereby the rate of revolution of the armature under the influence of a given current may be modified.

4. In an electric meter, the combination of a rotating armature, a polarizing-conductor for the armature, a second conductor receiving currents by induction from the first and serving to polarize the armature in a different direction, said second conductor being composed of uninsulated conducting material laminated in a direction at right angles to its axis, and an adjustable support therefor, whereby it may be turned about the axis of said armature.

5. In an electric meter having a rotating armature, an inducing-conductor for polarizing the armature, and a second inducing-conductor receiving currents from the first by induction and polarizing the armature in a different direction, the first-named conductor being formed of two separate conductors having their terminals brought out independently, whereby the conductors may be connected either in series or in multiple arc, as required.

6. In an electric meter having a rotating armature, a polarizing-conductor for the armature, a second polarizing-conductor placed at an angle to the first and consisting of continuous rings of conducting material placed side by side and bolted together, and interposed washers.

7. In an electric meter having a rotating armature, a polarizing-conductor for the armature, a second polarizing-conductor placed at an angle to the first and consisting of continuous rings of conducting material placed side by side, and interposed washers.

8. In an electric meter having a rotating armature, a polarizing-conductor for the armature, a second polarizing-conductor placed at an angle to the first and consisting of continuous rings of conducting material placed side by side.

9. In an alternate-current electric meter, the combination of a primary coil, a closed secondary coil receiving currents by induction, and a moving part comprising a circular armature of magnetizable material and a copper support therefor.

10. In an alternate-current electric meter, the combination of the primary coil, a closed secondary coil receiving currents by induction, and a moving part comprising a circular armature of magnetizable material and a support therefor of non-magnetizable material.

11. In an alternate-current electric meter, a primary coil, a closed secondary circuit receiving currents by induction, an armature of magnetizable material, a cylindrical support of copper, and shaft for carrying the same.

12. In an alternate-current electric meter, a primary coil, a closed secondary circuit receiving currents by induction, an armature of magnetizable material, a cylindrical support of copper, a shaft for carrying the same, and a counting, registering, or indicating device operated by the shaft.

In testimony whereof I have hereunto subscribed my name this 29th day of October, A. D. 1888.

OLIVER B. SHALLENBERGER.

Witnesses:
 CHARLES A. TERRY,
 C. C. WOLFE.